United States Patent [19]

Dmochowski

[11] 4,212,150

[45] Jul. 15, 1980

[54] RAKE ATTACHMENT FOR GARDEN TOOL

[76] Inventor: Frank M. Dmochowski, 41210 Ave. 10½, Madera, Calif. 93637

[21] Appl. No.: 973,143

[22] Filed: Dec. 26, 1978

Related U.S. Application Data

[63] Continuation-in-part of Ser. No. 696,178, Jun. 15, 1976, abandoned.

[51] Int. Cl.² ............................................. A01D 7/00
[52] U.S. Cl. ................................ 56/400.06; 56/400.2; 172/375; 294/51
[58] Field of Search ........... 56/400.06, 400.05, 400.04, 56/400.07, 400.18, 400.19, 400.2; 172/372–375; 7/1 L; 294/51, 52, 53.5; 15/257.1, 257.4, 257.7

[56] References Cited

U.S. PATENT DOCUMENTS

| | | | |
|---|---|---|---|
| 1,091,576 | 3/1914 | Hylan | 172/372 X |
| 1,100,115 | 6/1914 | Braasch | 172/373 X |
| 1,156,714 | 10/1915 | Schroeder et al. | 172/375 X |
| 1,191,945 | 7/1916 | Carlson | 294/53.5 X |

FOREIGN PATENT DOCUMENTS

80780  7/1951  Czechoslovakia ..................... 172/374

Primary Examiner—Jay N. Eskovitz
Attorney, Agent, or Firm—Vergil L. Gerard

[57] ABSTRACT

Disclosed is a combination weed cutter and rake which cooperate by utilization of a common handle to permit weeds cut with a weed cutter to be raked into a pickup pile with the same implement. The rake is pivotally mounted on the handle at its lower end and is movable against a spring force into a work position back to back with the weed cutter with its tines extended below the weed cutter but directed 180° rotationally therefrom, and is locked in this position by a pin passed through a lock ear. The rake is urged by the spring to a stowed position with the tines disposed upwardly toward the mid-section of the handle and away from the action area of the weed cutter. In an alternate form, the rake is held in its work position or stowed position by resilient finger latches.

7 Claims, 10 Drawing Figures

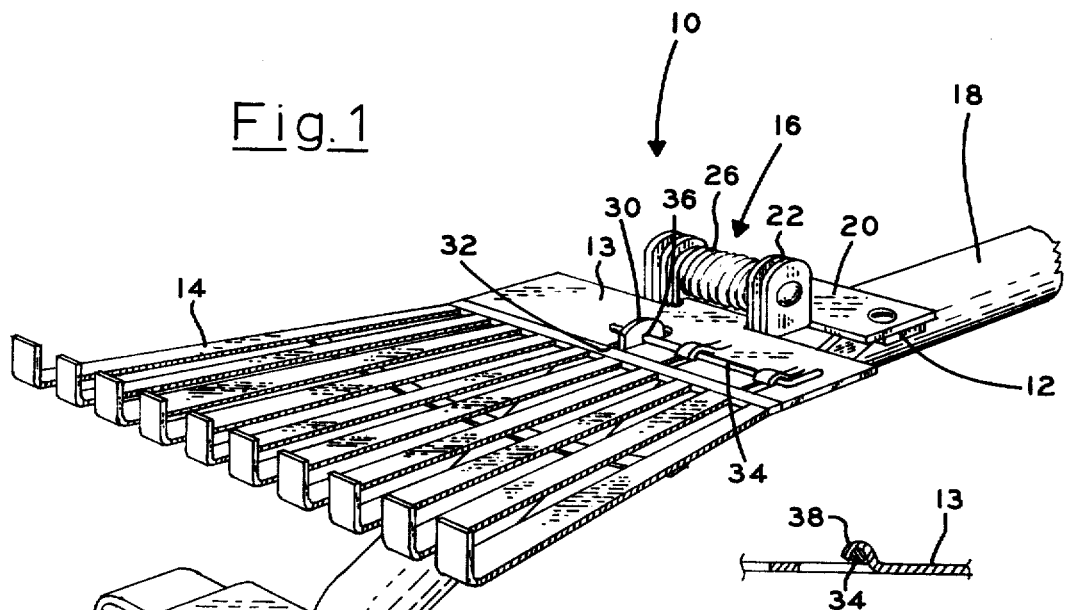
Fig. 1
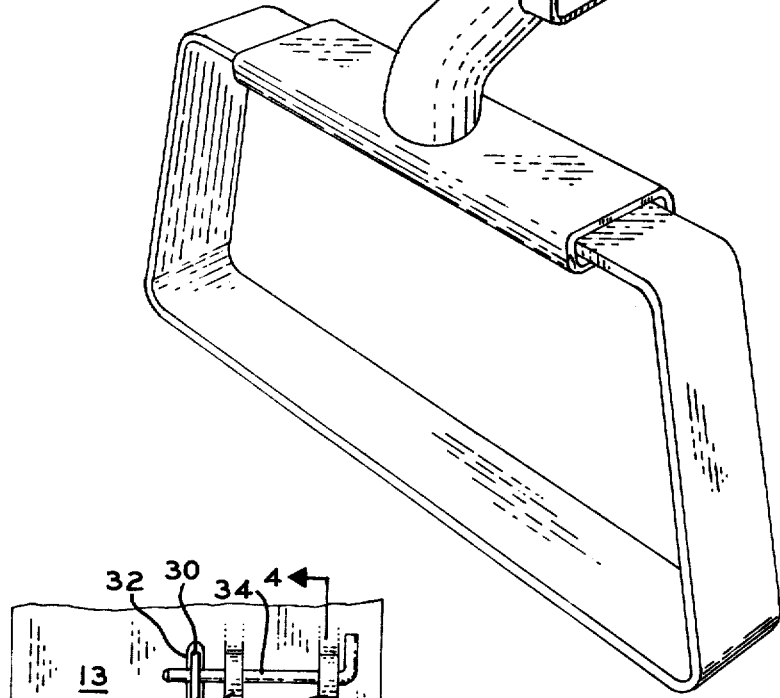
Fig. 4
Fig. 3
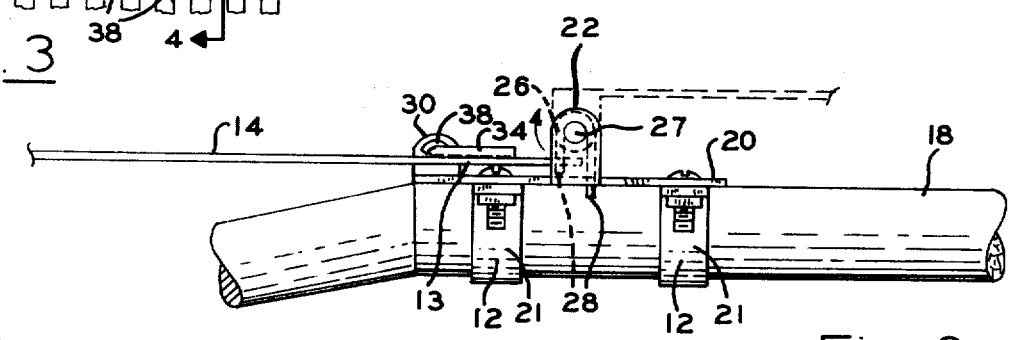
Fig. 2

RAKE ATTACHMENT FOR GARDEN TOOL

This application is a continuation-in-part of application for Rake Attachment for Garden Tool, Ser. No. 696,178 filed June 15, 1976, now abandoned.

BACKGROUND OF INVENTION

This invention relates generally to garden tools, and more particularly to dual function garden tools in which a rake attachment is associated with a weed cutter. In backyard gardening, light weight, manipuable weed cutters have become quite popular. The convenience of these weed cutters is diminished, however, by the fact that after an area of weeds has been cut, the weed cutter must be set aside and a rake used as a separate tool to gather the cut weeds into a pickup pile. This, of course, mandates the use of two tools, and frequently the garden worker must stop his work to search for one or the other. Since the two tools cooperate in providing the necessary equipment for cutting and gathering weeds, their combination into a dual function tool is logical, and has previously been conceived and attempted.

Commercial acceptance of the prior art structures combining these tools have not met with any appreciable acceptance, however, since they have been so structured that they provided inconveniences at least equal to their convenience. The prior art combinations of these tools have not resulted in a dual function tool in which the rake and weed cutter cooperate toward a desired result of cutting and gathering weeds. In many of the previously known devices the rake is so positioned that it unduly interferes with the weed cutter, limiting its mobility and effectiveness. In others, the combination results in a tool so expensive to manufacture that it is not commercially feasible.

A need, therefore, exists for a weed cutting and gathering tool which has a weed cutter for cutting weeds and a rake disposable to gather the cut weeds by mere rotation of a common handle 180°, and in which the rake is stowable so that it does not interfere with the garden obstacles such as sprinkler, buildings and plants when the weeding tool is being used.

It is, therefore, a major object of my invention to provide a rake attachment for a weeding tool which mounts on the tool handle with the distal ends of the rake tines extended below and directed 180° opposite to the weed cutter when the rake is in its work position and is movable into a stowed position wherein the tines are directed away from the weed cutter and disposed about midway up the handle, out of the way of potential conflict with garden obstacles when the weed cutter is in use.

It is also an important object of my invention to provide a rake attachment for a weeding tool which is readily mountable on the lower end of the handle of any common weed cutting tool and is secured in its operative position by merely sliding a locking pin and rotating the tool handle 180°.

It is another object of my invention to provide a combined weed cutting and raking tool of the type described in which the rake attachment is positionable against resilient urging into a work position and secured there by a manually operable locking pin where the distal ends of its tines extend beyond the weed cutter at the lower end of the tool handle but are directed 180° from the weed cutter blade, and can be returned to a stowed position by resilient urging upon release of the locking pin, where it is out of conflict with the weed cutter blade.

It is a further object of my invention to provide a weed cutting and raking tool of the type described in which the rake attachment can be separately manufactured and easily attached to most commonly used weed cutting tools.

It is still another object of my invention to provide a combined weed cutting and raking tool of the type described which is inexpensive to manufacture and easy to install.

These and other objects and advantages of my invention will become more readily apparent from the following detailed description of a preferred embodiment when read together with the accompanying drawings in which:

FIG. 1 is a perspective view of a preferred embodiment of my invention attached to a weed cutting tool;

FIG. 2 is a partial side elevational view of the mounting of my preferred embodiment of the weed cutting tool handle;

FIG. 3 is a partial plan view showing the position lock pin;

FIG. 4 is a sectional view taken at 4—4 in FIG. 3;

Figure 5:
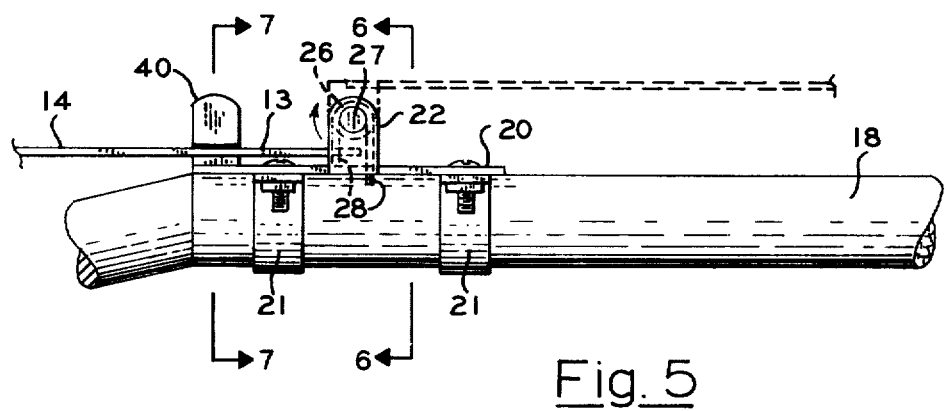
FIG. 5 is a partial side elevational view of a modified form of mounting for my rake attachment.

Referring now to the drawings, the numeral 10 designates my rake attachment generally. The rake attachment 10 has a clamp 12, base 13, tines 14 and a pivotal connection 16, which interconnects the rake base with the clamp.

The clamp 12 is contoured to accept and clamp onto a cylindrical handle 18 and includes a plate member 20 which is secured to the handle by a pair of semi-circular brackets 21. The rake base 13 supports the rake tines 14 which extend therefrom in a fan shaped pattern. Although the rake tines in my preferred embodiment are formed of spring metal, they could as well be of plastic or bamboo, or the rake could have rigid iron tines of the usual configuration.

The pivotal connection 16 consists of a hinge 22 mounted between the plate member 20 of clamp 12 and the base 13. A coil spring 26 with oppositely extending legs 28, one of which engages the plate member 20 and the other of which engages the base 13, is mounted on the hinge 22 in a manner which urges the plate member and base together about the hinge. The coil spring 26 is disposed concentrically about a hinge pin 27 of the hinge 22 and is thus held in place.

A lock ear 30 projects upward from the clamp 12 and is disposed to pass through a slot 32 in the base 13 when the rake base is pivoted about the hinge 22 to place the rake tines 14 in their work position as in FIG. 2. A lock pin 34 is inserted in a hole 36 in the lock ear 30 to hold the rake against the resilient urging of the spring 26. The lock pin 34 slides reciprocally in a pair of bales 38 so it stays with the base 13 when the rake is released from its work position and urged to its stowed position by the spring 26.

Figure 6:
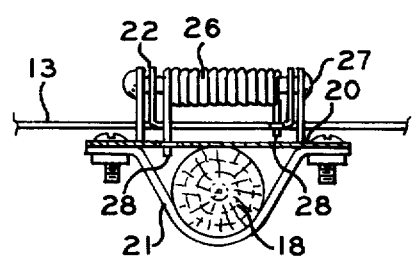
FIG. 6 is a sectional view taken at 6—6 in FIG. 5.
Figure 7:
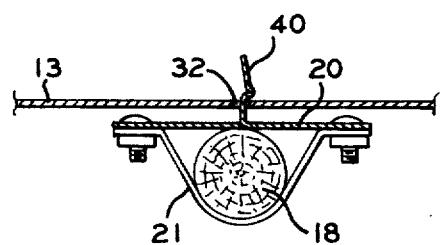
FIG. 7 is a sectional view taken at 7—7 in FIG. 5.

In FIGS. 5-7, I show a modified form of my invention in which the lock ear 30 and lock pin 34 are replaced by a spring latch 40. The spring latch 40 projects through the slot 32 and has a lip that engages the rake base 13 and holds the rake in its work position. The spring latch 40 is movable laterally in the slot 32 to disengage the lip from the rake base and release the rake for resiliently urged movement to its stowed position.

OPERATION

Having described the structural parts of my preferred embodiment I will now describe its operation. The rake attachment 10 is mounted on a lower end of the handle 18 of a garden tool with a weed cutter. The mounting is achieved by means of a clamp 12 which is clamped to the lower end of the handle 18. For weed cutting, the rake blade 13 is placed in its stowed condition by being pivoted about the hinge 22 of the pivotal connection 16 to place the tines 14 in an upwardly directed position. In this position the rake blade 13 is held by the spring 26 in extended condition with the spring legs 28 urging the two parts of the pivotal connection 16 together and into parallel alignment. In this position the tines of the rake blade are disposed where they will not interfere with the weed cutting blade when it is passed under shrubs and near other garden obstacles. The weed cutting blade may, therefore, be used in the normal fashion to work around close areas as well as in open areas.

When it is desired to use the tool to gather weeds cut with the weed cutter, the rake blade is pivoted by means of the hinge 22 against the resilient urging of spring 26 away from the stowed position and into a working position where the pivotal connection 16 is extended in co-planar alignment and the tines 14 of the rake extend downward beyond the weed cutter blade but face in an opposite direction. The handle is then rotated 180° to place the tines 14 of the rake blade 13 into contact with the ground beyond the weed cutter blade, so that the weed cutter blade extends upwardly from the handle out of conflict with the area being manipulated by the rake. The pin 34 is then slidable inserted through the hold 36 in the lock ear 30 to hold the rake blade in the work position. Or, in my modified form, the spring latch 40 holds the rake in the work position (see FIGS. 5-7).

ALTERNATE FORM

Figure 8:
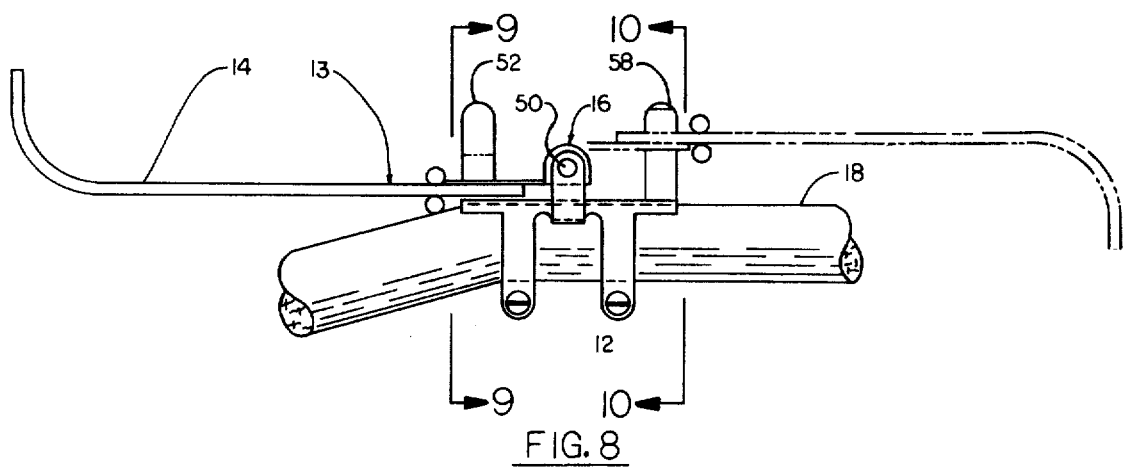
FIG. 8 is a side elevational view of an alternate form of my invention showing the stowed position of the rake in phantom.
Figure 9:
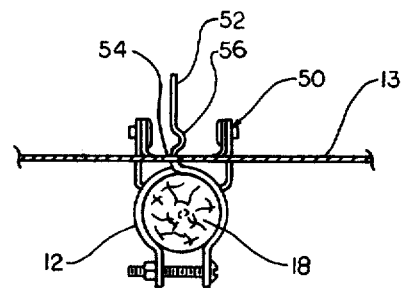
FIG. 9 is a sectional view taken on 9—9 in FIG. 8.
Figure 10:
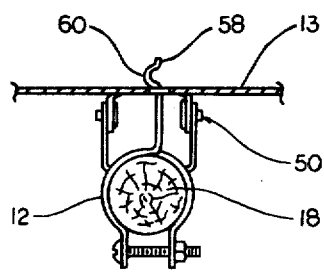
FIG. 10 is a sectional view taken on 10—10 in FIG. 8.

In FIGS. 8-10 I show an alternate form of my invention in which the pivot spring is eliminated and the rake blade is held in both its work and stowed positions by spring latches. In this form, the rake blade 13 is mounted on the handle 18 by a clamp 12, the same as in my first form. The pivotal connection 16 is formed by related pairs of upstanding ears on the rake blade 13 and plate member 20 which form a hinge 50. The hinge 50 is similar to the hinge 22 of my first form and permits pivotal movement of the rake from its stowed to its work position, however it has no concentric coil spring.

As best shown in FIG. 9, the rake blade 13 is held in its work position by a resilient finger latch 52 which projects through a slot 54 in the rake blade and holds the rake blade by means of a cleat 56 on the latch. The slot 54 is wide enough to pass the cleat 56 when the finger latch 52 is deflected to align the cleat and slot.

As shown in FIG. 10, the rake blade is held in its stowed position by a resilient stow latch 58. The stow latch 58 passes through the slot 54 when the rake blade is pivoted to its stow position and is held by a stow cleat 60 on the stow latch. The stow latch 58 releases the rake blade in the same manner as latch 52.

From this description of the structure and operation of my invention it will be apparent that I have provided a cooperating and combined weed cutter and rake, particularly a rake attachment for a weed cutter which permits the rake to be stowed out of any conflict with garden obstacles when the weed cutter is used and yet to be readily moved into a working position where the rake is fully as effective as an independent rake and much more readily available.

It should be understood that although I have described my rake attachment in combination with a weed cutter it will work as well on any other long handled garden tool, and in fact, the attachment may be used to mount a tool different than a rake such as a hoe or spade. The essence of my invention is a readily attachable auxiliary tool which can be easily manuvered between stowed and working positions thereby avoiding conflict with the principal tool to which it is attached, during use of that tool.

It should also be understood, from this description of the structure and operation of my invention, that it is fully capable of achieving the objects and providing the advantages heretofore attributed to it.

I claim:

1. In a hand tool having a first tool blade mounted on one end of an elongated handle an attachment for mounting a second tool blade on said handle comprising:

clamp means disposed to engage and removably clamp onto a portion of said handle adjacent the mounting of said first tool blade thereon, said clamp means having a clamp plate;

a second tool blade having a blade base plate at a proximal end and ground engaging surfaces at a distal end; and pivotal connection means interconnecting said second tool blade and said clamp means, said pivotal connection means including hinge means interconnected between said clamp plate and said blade base plate and disposed to permit pivotal movement of said second tool blade between a work position wherein said second tool blade is positioned adjacent said first tool blade and a stowed position wherein said ground engaging surfaces of said blade are positioned adjacent a portion of said handle and directed oppositely from said first tool blade, and securing means disposed to releasably secure said second tool blade in either said work position or said stowed position;

said hinge means of said pivotal connection means includes a pair of spaced parallel base hinge ears projecting from said blade base and having a pair of aligned hinge pin holes therein, and a pair of spaced parallel plate hinge ears projecting from said clamp plate and having a pair of aligned hinged pin holes; and said securing means of said pivotal connection means includes a coil spring mounted coaxially on said hinge pin and contained between said hinge ears, said coil spring having legs extending from opposite ends thereof, one engaged with said clamping means plate and the other engaged with said second tool blade base with said spring stressed to resiliently urge said base into overlapping parallel relationship with said clamp plate and thereby dispose said second tool blade in its stowed position.

2. An attachment as described in claim 1, in which:
said pivotal connection means interconnects said second tool blade base plate to said clamp plate with said second tool blade disposed in back to back relationship with said first tool blade when said second tool blade is in its work position, whereby said second tool blade is placed in a use position and said first tool blade is removed from a use position by rotating said handle 180°.

3. In a hand tool blade mounted on one and of an elongated handle, an attachment for mounting a second tool blade on said handle comprising:
clamp means disposed to engage and removably clamp onto a portion of said handle adjacent the mounting of said first tool blade thereon, said clamp means having a clamp plate;
a second tool blade having a blade base plate at a proximal end and ground engaging surfaces at a distal end; and
pivotal connection means interconnecting said second tool blade and said clamp means, said pivotal connection means including hinge means interconnected between said clamp plate and said blade base plate and disposed to permit pivotal movement of said second tool blade between a work position wherein said second tool blade is positioned adjacent said first tool blade and a stowed position wherein said ground engaging surfaces of said blade are positioned adjacent a portion of said handle and directed oppositely from said first tool blade, and securing means disposed to releasably secure said second tool blade in either said work position or said stowed position;
said securing means of said pivotal connection means includes a lock slot in said second tool blade base, a lock ear projecting from said clamp and disposed to pass through said lock slot when said second tool blade is in one of said positions, to lock said blade base to said clamp plate and secure said second tool blade in said position.

4. In a hand tool blade mounted on one end of an elongated handle, an attachment for mounting a second tool blade on said handle comprising:
clamp means disposed to engage and removably clamp onto a portion of said handle adjacent the mounting of said first tool blade thereon, said clamp means having a clamp plate;
a second tool blade having a blade base plate at a proximal end and ground engaging surfaces at a distal end; and
pivotal connection means interconnecting said second tool blade and said clamp means, said pivotal connection means including hinge means interconnected between said clamp plate and said blade base plate and disposed to permit pivotal movement of said second tool blade between a work position wherein said second tool blade is positioned adjacent said first tool blade and a stowed position wherein said ground engaging surfaces of said blade are positioned adjacent a portion of said handle and directed oppositely from said first tool blade, and securing means disposed to releasably secure said second tool blade in either said work position or said stowed position;
said securing means of said pivotal connection means includes a lock slot in said second tool blade base, a lock latch projecting from said clamping means plate and laterally displacable resiliently, said lock latch having a catch lip thereon and being disposed to pass through said lock slot and engage said catch lip on edge of said lock slot when said second tool blade is in one of said positions whereby said second tool blade is locked in said position and is releasable therefrom by lateral displacement of said lock latch in said lock slot to release said catch lip from the edge of said slot.

5. A rake attachment for a garden weeding hand tool with a weeding blade mounted on the lower end of an elongated pole shaped handle, said attachment comprising:
a rake blade having a base and a plurality of spring tines projecting therefrom;
a clamp having a plate and fastening means for releasably securing said plate to said handle adjacent to lower end thereof;
a hinge interconnecting said clamp plate and said rake base and disposed normal to the longitudinal axis of said handle, whereby said rake blade is pivotally movable about an axis normal to the axis of said handle between a work position in which said rake tines are disposed adjacent said weeding blade and a stowed position in which said rake tines are disposed adjacent said handle at a point above the position of said clamp; and
securing means releasably securing said rake blade alternatively in said work position and said stowed position;
said securing means includes a lock slot and a projecting resilient lock ear interposed between said second tool blade base and said clamp and disposed to interlock when said second tool blade base is disposed in said stowed position adjacent said handle to secure said second tool blade base to said clamp, and to release said second tool blade base from said clamp upon manual deflection of said lock ear.

6. A rake attachment as described in claim 5, in which:
said hinge is disposed to interconnect said rake base with said clamp plate with said rake positioned back to back with said weed blade when said rake blade is in said work position whereby said rake blade, when in said work position, is placed in use by rotating said handle 180° from the use position of said weed blade.

7. A rake attachment for a garden weeding hand tool with a weeding blade mounted on the lower end of an elongated pole shaped handle, said attachment comprising:
a rake blade having a base and a plurality of spring tines projecting therefrom;
a clamp having a plate and fastening means for releasably securing said plate to said handle adjacent to lower end thereof;
a hinge interconnecting said clamp plate and said rake base and disposed normal to the longitudinal axis of said handle, whereby said rake blade is pivotally movable about an axis normal to the axis of said handle between a work position in which said rake tines are disposed adjacent said weeding blade and a stowed position in which said rake tines are disposed adjacent said handle at a point above the position of said clamp; and securing means releasably securing said rake blade alternatively in said work position and said stowed position;

said securing means includes a spring disposed between said clamp plate and said rake base and stressed to urge said rake base into parallel overlapping position with respect to said clamp plate, and releasable lock means disposed to releasably secure said rake base in co-planar alignment with said clamp plate against the resilient urging of said spring; and said spring is mounted on said hinge pin in co-axial alignment therewith and is coiled thereabout with extended legs at each end one of which engages said rake base and the other of which engages said clamp plate, and said releasable lock means includes an ear and slot interconnected between said rake base and said clamp plate and releasably engagable to secure said rake base and said clamp plate in fixed position.

* * * * *